(12) United States Patent
Harlaux-Pasquier et al.

(10) Patent No.: US 8,980,354 B2
(45) Date of Patent: Mar. 17, 2015

(54) FROZEN CONFECTIONERY PRODUCT AND METHOD OF MANUFACTURE

(75) Inventors: Ginette A. Harlaux-Pasquier, Beauvais (FR); Francis V. Bertrand, Laversines (FR); Loic Beucher, Loupfougeres (FR)

(73) Assignee: Nestec S.A., Vevey (CH)

( * ) Notice: Subject to any disclaimer, the term of this patent is extended or adjusted under 35 U.S.C. 154(b) by 724 days.

(21) Appl. No.: 12/160,981

(22) PCT Filed: Nov. 20, 2006

(86) PCT No.: PCT/EP2006/068685
§ 371 (c)(1),
(2), (4) Date: Jul. 15, 2008

(87) PCT Pub. No.: WO2007/080026
PCT Pub. Date: Jul. 19, 2007

(65) Prior Publication Data
US 2010/0196551 A1    Aug. 5, 2010

(30) Foreign Application Priority Data

Jan. 16, 2006 (EP) .................................. 06100392

(51) Int. Cl.
*A23G 3/02* (2006.01)
*A23P 1/00* (2006.01)
(Continued)

(52) U.S. Cl.
CPC .. *A23G 9/04* (2013.01); *A23G 9/26* (2013.01);
*A23G 9/44* (2013.01); *A23G 9/48* (2013.01);
*A23G 9/50* (2013.01); *A23G 9/503* (2013.01)
USPC ............... 426/515; 426/89; 426/91; 426/100;
426/101; 426/306

(58) Field of Classification Search
CPC ..... A23G 9/48; A23G 2200/08; A23G 9/322;
A23G 9/24; A23G 9/285; A23G 9/52; A23G 9/26
USPC ....................................... 426/89, 91, 100, 101
See application file for complete search history.

(56) References Cited

U.S. PATENT DOCUMENTS 1,718,997 A * 7/1929 Cora ............................... 426/91
2,048,364 A * 7/1936 Willems ........................ 426/101
(Continued)

FOREIGN PATENT DOCUMENTS

CA        1336239        7/1995
CL        4682004        5/2005
(Continued)

OTHER PUBLICATIONS

Stauffer., "Chocolate Behavior—What Influences Your Selection?" Tha Manufacturing Confectioner pp. 75-79, Sep. 1998.*

*Primary Examiner* — Rena L Dye
*Assistant Examiner* — Assaf Zilbering
(74) *Attorney, Agent, or Firm* — Dunlap Codding P.C.

(57) ABSTRACT

A process for making a frozen confectionery product by providing a mold with closed and opened ends in a refrigerated environment, filling the mold with a liquid mix to form a shell, removing non-solidified liquid mix from the mold, pressure-filling the shell in the mold with a frozen confection, inserting a stick in the frozen confection, removing the product from the mold and packing the resulting product. In such process, inclusions may be homogeneously distributed in the liquid mix or in the frozen confection or can be accumulated on the top of the frozen confection after filling the mold. The resulting product, a molded ice confectionery stick bar, is also an embodiment of the invention.

21 Claims, 1 Drawing Sheet

(51) Int. Cl.
*A23L 1/00* (2006.01)
*A23G 3/00* (2006.01)
*B65D 85/00* (2006.01)
*A23G 3/20* (2006.01)
*A23G 9/00* (2006.01)
*A23G 1/00* (2006.01)
*A23G 9/04* (2006.01)
*A23G 9/26* (2006.01)
*A23G 9/44* (2006.01)
*A23G 9/48* (2006.01)
*A23G 9/50* (2006.01)

(56) References Cited

U.S. PATENT DOCUMENTS

| | | | | |
|---|---|---|---|---|
| 2,176,408 | A * | 10/1939 | Peterson | 426/91 |
| 2,288,970 | A * | 7/1942 | Weisbender | 426/76 |
| 3,529,553 | A * | 9/1970 | Hansjoerg | 425/89 |
| 3,770,460 | A * | 11/1973 | Vroman | 426/279 |
| D297,880 | S * | 10/1988 | Beckham et al. | D1/102 |
| 5,011,704 | A * | 4/1991 | Smagula et al. | 426/660 |
| 5,283,070 | A * | 2/1994 | Bertrand et al. | 426/249 |
| 5,374,436 | A * | 12/1994 | White et al. | 426/249 |
| 5,556,659 | A * | 9/1996 | De Pedro et al. | 426/302 |
| 5,783,239 | A * | 7/1998 | Callens et al. | 426/68 |
| 5,798,131 | A * | 8/1998 | Bertrand et al. | 426/293 |
| 5,843,512 | A * | 12/1998 | Daouse et al. | 426/512 |
| 5,958,493 | A * | 9/1999 | Grigoli | 426/421 |
| 6,004,606 | A * | 12/1999 | French et al. | 426/516 |
| 6,174,555 | B1 * | 1/2001 | Leas et al. | 426/100 |
| 6,214,394 | B1 * | 4/2001 | Beer | 426/302 |
| 6,231,901 | B1 | 5/2001 | Sharkasi et al. | 426/101 |
| 6,284,294 | B1 * | 9/2001 | French et al. | 426/100 |
| 6,713,101 | B2 * | 3/2004 | Lometillo et al. | 426/91 |
| 6,955,829 | B2 * | 10/2005 | Binley et al. | 426/101 |
| 7,754,260 | B2 * | 7/2010 | Kruik et al. | 426/275 |
| 2002/0164403 | A1 | 11/2002 | Lometillo et al. | 426/91 |
| 2003/0064137 | A1 | 4/2003 | Cathenaut et al. | 426/103 |
| 2004/0180120 | A1 | 9/2004 | Leas et al. | 426/139 |
| 2005/0202132 | A1 * | 9/2005 | Wolever et al. | 426/138 |

FOREIGN PATENT DOCUMENTS

| | | |
|---|---|---|
| CN | 1431869 | 7/2003 |
| EP | 0 322 469 A1 | 7/1989 |
| EP | 0 740 906 A2 | 11/1996 |
| EP | 1 040 760 A1 | 10/2000 |
| EP | 1159879 B1 | 12/2001 |
| WO | WO 01/91573 A1 | 12/2001 |

* cited by examiner

FROZEN CONFECTIONERY PRODUCT AND METHOD OF MANUFACTURE

This application is a 371 filing of International Patent Application PCT/EP2006/068685 filed Nov. 20, 2006.

FIELD OF THE INVENTION

The present invention relates to frozen confectionery products. It also relates to a method for the manufacture of such products.

BACKGROUND OF THE INVENTION

Many frozen confectionery products are known. Increasingly, there is a consumer demand for composite products formed from different edible materials in complementary combinations in the premium category. One desirable combination is ice cream stick bar with chocolate coating which gives a contrast of texture between the crispy chocolate and the soft aerated ice cream. There are, however, significant production difficulties involved in the integration of these materials in various shapes and sizes to produce interesting new products in a consistent and cost-effective manner.

Frozen confectionery stick bars are manufactured on an industrial scale by means of moulding or by means of extrusion.

The extrusion method of forming chocolate based frozen stick bars is to provide a core of aerated frozen confection out of a freezer by vertical extrusion of an extrudate from an extrusion die onto refrigerated plates, cutting the extrudate into slabs of oval section while inserting a stick from the side, hardening the slabs in a cold air tunnel, taking out the slabs from the supporting plates by the sticks and dipping them into a bath of fat based coating, e.g. chocolate. When extrusion is employed, a sausage shape of plastic consistency, which is relatively hard at a temperature of the order of −6° C. to −7° C., is produced. Extrusion gives the products a fine, less crystallized texture than that of moulded products. The fine texture obtained by means of extrusion is largely due to the freezing conditions in a freezer and, in particular, to the freezing temperature at the exit from the freezer. That is to say, the lower the temperature, the fewer large crystals are formed. This means that the faster the freezing, the smaller the ice crystals and the finer the texture. One disadvantage of that method is that very limited shapes can be produced and the aspect and the definition of the surface of the coated product are generally poor. In addition there are problems associated with dipping, such as irregular thickness of the coating, cracking and bleeding.

Another known method of forming chocolate based confectionery products involves moulding. It comprises pouring or spraying molten chocolate into a female mould, and then pouring off the excess such that the residual material hardens around the inner surface of the mould in order to create a chocolate shell. One disadvantage of this technique is that the results are highly dependent upon the viscosity of the molten chocolate, which can vary with composition, as well as temperature and ambient humidity. This makes it difficult to regulate precisely how much material adheres to the mould, and hence the amount of excess material that will be poured off. Consequently, it is difficult to predict the wall thickness and mass of the finished product. A further problem is that the method often gives rise to a non-uniform wall thickness in the product, due to the pooling of molten chocolate toward the lowermost part of the mould.

A liquid composition is then generally poured into the mould where it is frozen. The freezing of the liquid composition to be frozen by means of moulding through simple thermal conduction in a mould immersed in a refrigerating solution is slow and leads to the formation of considerably large crystals. In this process, the composition to be frozen is always metered out in the liquid state into moulds with a view to guaranteeing satisfactory filling and to preventing the creation of air pockets, and its temperature is of the order of −2° C. to −3° C. The proportion of frozen water is low and most of the process of freezing the product takes place in the moulds. This explains the presence of a coarse, more crystallized texture, owing to an increase in the size of the crystals.

A method for producing ice cream stick bars coated with chocolate by moulding is disclosed in US 2002/0146496 and in US 2002/0149488. The objective of this method is to avoid the disadvantages of known moulding methods using brine cooling equipment in which an insulating air casing is created between the mould wall and the formed chocolate layer that considerably slows down the freezing process. It comprises filling pre-cooled moulds with chocolate until a layer of chocolate is formed against the mould wall, back-sucking the liquid chocolate core to create a cavity, filling the mould lined with chocolate with a pasty, i.e. non frozen ice cream mix, chilling the upper surface in an air tunnel provided with nitrogen to create a plug for closing the cavity which thus avoids vertical expansion of the filling on freezing and instead directs the ice cream filling toward the mould wall for better efficiency in the completion of the freezing in a brine bath.

It is the object of the present invention to improve the moulding of coated frozen confectionery products.

This object is achieved by means of the features of the independent claims.

The dependent claims develop further the central idea of the invention.

SUMMARY OF THE INVENTION

In a first aspect, the invention provides a process for making a frozen confectionery product comprising the steps of:
  Providing a mould with a closed and an opened end in a refrigerated environment,
  Filling said mould with a liquid mix to form a shell,
  Removing the non-solidified liquid mix from the mould at least once,
  Pressure-filling the shell in the mould with a frozen confection,
  Inserting a stick in the frozen confection,
  Removing the product from the mould and packing said product.

Inclusions may be homogeneously distributed in the liquid mix and/or in the frozen confection and/or accumulated on the top of the frozen confection after filling the mould with the frozen confection.

In a particular aspect, the method provides an additional step of closing the top of the ice confectionery bar with a layer of confectionery fat based composition or frozen confection with or without inclusions.

In a second aspect, the invention provides a product obtainable by such process.

In a third aspect, the invention provides a moulded ice confectionery stick bar comprising:
  a shaped shell formed from a confectionery fat based composition by moulding, the shell having an opened end and a closed end and a substantially regular wall thickness and a filling of ice confectionery, wherein:
  the shape of the shell has a precise definition corresponding to the internal surface of the mould,
  the external surface of the shell has a smooth and glossy appearance and
  dry inclusions are homogeneously distributed within the shell.

Optionally, the moulded ice confectionery stick bar comprises a top filling of confectionery fat based composition or frozen confection with or without inclusions for closing the opened end of the shell.

In a fourth aspect is provided a frozen confectionery product obtainable by a process comprising the steps of
  a. Providing a mould with a closed and an opened end in a refrigerated environment,
  b. Filling said mould with a liquid mix to form a shell lining the mould,
  c. Removing the non-solidified liquid mix from the mould at least once,
  d. Filling the shell lining of the mould with a confection,
  e. Inserting a stick in the confection,
  f. Removing the product from the mould and packing said product,
    wherein in at least one of the steps b.) or d.) or between step d.) and f.) inclusions are added.

FIGURES

The present invention is further described hereinafter with reference to one of its preferred embodiments shown in the accompanying drawings in which.

Figure 1:
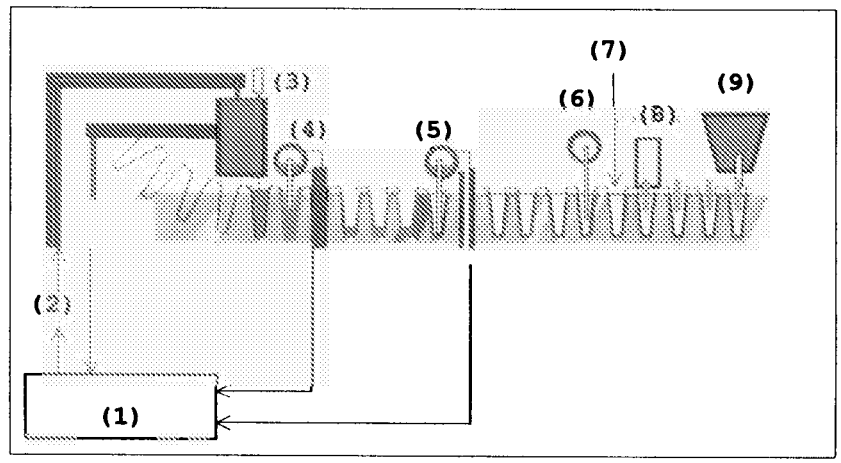
FIG. 1 shows a typical equipment set up for the manufacture of a product of the invention.

With reference to the above-mentioned FIG. 1, the system includes a liquid mix container (1) connected to the liquid mix dosing system (3) via a pump (2), a first suction device (4) and a second suction device (5), an ice-cream filler (6), an optional dry inclusion dosing system (7), a stick insert (8) and a chocolate or liquid dosing system (9).

Figure 2:
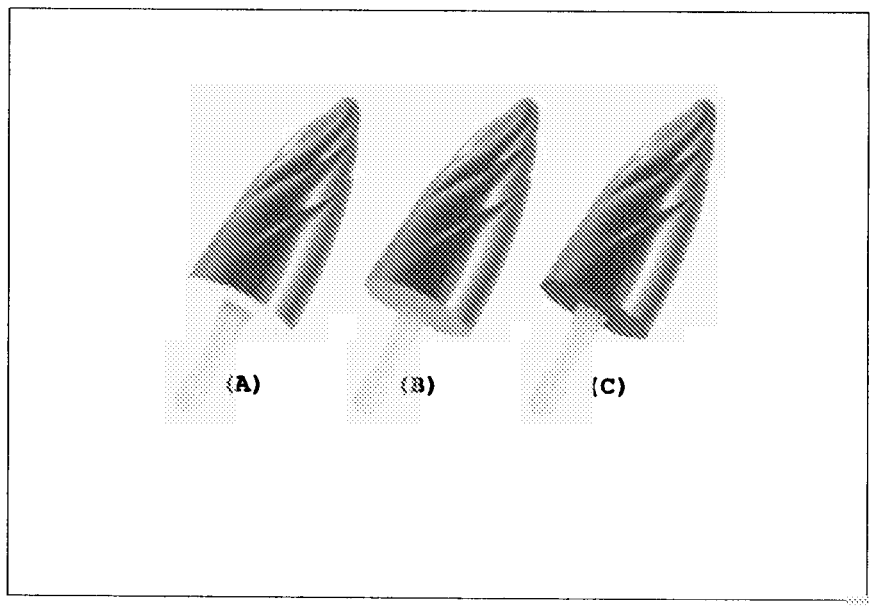
FIG. 2 shows a finished product obtainable by the process of the invention on a reduced scale.

With reference to the above-mentioned FIG. 2, the finished product exhibits a smooth and glossy surface, with a wide possibilities for "closures". Product (A) shows a closure containing inclusions. Product B shows a closure of different composition to the coating, while product C illustrates that the closure can be of the same composition as the coating.

DETAILED DESCRIPTION OF THE INVENTION

The present invention relates to the manufacture of a moulded "shell and core" product, whereby the shell is provided by a liquid mix which solidifies upon contact with a refrigerated mould and whereby the core consists mainly of a frozen aerated confection.

The manufacturing process consists in a first step to provide refrigerated moulds which have opened and closed ends. This is preferably achieved by providing an inline machine. The moulds are cooled to a temperature below 0° C., e.g. of about −5° C.

The moulds are then filled with a "liquid mix". By "liquid mix" is meant any preparation used in the production of a shell. Such preparation preferably comprises a confectionery fat, i.e. a vegetable fat or fraction thereof, possibly hydrogenated or a mixture of such fats and fractions. Such a liquid mix composition may contain sugar or milk solids as is the case for chocolate. The temperature of the "liquid mix" is kept at a temperature such that all ingredients form a liquid phase. The typical temperature is in the range of 30° C. to 70° C.

The "liquid mix" optionally further contains inclusions of sugar confectionery such as e.g. gels, marshmallow, fudge or pieces of preserved fruit, nuts, almonds, nougatine, coconut, cocoa nibs, toasted, puffed or roasted cereal flakes, biscuit crumbs etc. and combinations thereof. The inclusions are homogeneously distributed within the liquid mix prior to being brought in contact with the mould.

Upon contact with the refrigerated walls of the mould, the liquid mix quickly solidifies. Any non-solidified liquid mix is then removed e.g. using suck-backing technique. Such technique is described in EP 0 842 609. Other techniques for removing non-solidified liquid mix can equally be used.

Preferably, 2 back-suction units are supplied in succession. This allows the remaining pooled liquid mix (non-solidified) to be removed and thus avoids accumulation of liquid mix at the bottom of the so-formed shell.

When chocolate is used as the "liquid mix", the selection of the chocolate may be made according to its yield value and plastic viscosity. The lower the yield value, the faster the chocolate will flow after sucking it back. This provides for a thin and substantially regular wall thickness of the shell. A typical yield value for a chocolate liquid mix would be less than 0.10 Pa at 50° C.

Preferably it is 0.02 Pa at 50° C. The plastic viscosity of the chocolate should be greater than 0.15 Pa·s at 50° C., preferably it is 0.23 Pa·s at 50° C. With parameters in these ranges, the time for the crystallisation phase is shorter than in conventional processes. This advantageously results in an improved chocolate crispiness which confers desirable organoleptic properties to the product of the invention.

The liquid mix, after solidifying, thus results in a shell or a confectionery coating. It may be a "compound" coating, a fruit-based coating, ganache coating, soft biscuit preparations coating etc. Preferably, it is a chocolate coating. The chocolate may be dark, milk or white chocolate. The inclusions, when supplied together with the liquid mix for the shell, form together with the liquid mix a continuous layer of the shell which is in contact with the internal wall of the mould.

The mould of the present invention may be any mould of any shape. In particular, it may have curves, edges, waves for instance, in order to obtain an attractively designed moulded product.

Once the shell is formed, the core is introduced. The "core" of the product of the invention is a frozen confection which may be any aerated or non-aerated frozen confection. It may be ice-cream, sorbet, water ice etc.

The frozen confection may be of any flavour and may further contain sauces selected from chocolate sauce, fruit sauce, caramel sauce or any mixtures thereof.

It may also, additionally or alternatively to the inclusions of the shell, contain inclusions which are dry, solid ingredients, which provide a desirable texture contrast. The inclusions are selected from sugar confectionary such as gels, marshmallows, nougatine, fudge, pieces of preserved fruits and may also be nuts, almonds, coconut, cocoa nibs, toasted, puffed or roasted cereal flakes, biscuit crumbs or combinations thereof. Preferably the inclusions will not exceed 5 mm in size. More preferably they will be between 2 mm and 4 mm. These will be preferably homogeneously distributed in the frozen confection.

The frozen confection is distributed into the shell lining of the mould under a pressure of e.g. 1.5 to 2 bars. Such technology prevents the formation of air bubbles.

Furthermore, the frozen confection being distributed is maintained at a temperature of e.g. −6° C. This low temperature filling allows to manufacture products with creamy texture similar to extruded products. This provides improvements over moulding techniques of the prior art. Firstly, the frozen confection being already frozen, prior to distribution, will not have the coarse and more crystallised structure of the prior art products, whereby the size of the crystals is larger due to the fact that the freezing process taking place in the moulds is slower. Furthermore, no expansion of the frozen confection will take place in the moulds, thus avoiding any measures used in the prior art (see US 2002/146496) to prevent such expansion.

The frozen confection is filled to 3 mm to 8 mm of the top of the shell, or preferably filled to 5 mm of the top of the shell. Typically, this will amount to a volume of 70 to 120 ml.

Dry inclusions may then be added (alternatively or additionally to any other inclusions present in the shell and/or in the frozen confection) in a subsequent step. Due to the viscosity of the already frozen confection, the inclusions will gather and accumulate on the top of the frozen confection (open end of the mould) without sinking into the frozen confection.

Note that in the framework of the claims of specification, the "top end" is the open end of the mould and thus the end of the confectionery product where the stick is placed.

The inclusions may be any dry, solid ingredients selected from sugar confectionary such as gels, marshmallows, nougatine, fudge, pieces of preserved fruits and also nuts, almonds, coconut, cocoa nibs, toasted, puffed or roasted cereal flakes, biscuit crumbs or combinations thereof, which will confer organoleptic advantages to the product of the invention.

This subsequent step will lead to a controlled inhomogeneous distribution of the inclusions in the shell. This is in contrast to the homogeneous distribution of inclusions occurring with extrusion techniques.

A stick is then inserted into the frozen confection. After insertion of the stick, the top of the product of the invention may be "closed" with a filling. The filling may be a layer of confectionery fat or a layer of a frozen confection such as ice cream, sorbet or mixtures thereof. The filling will be kept at a low temperature (−4° C.).

After closure, the product of the invention is demoulded using a conventional extraction machine and packed.

The product obtained by the process of the invention will have an optimised thin, homogeneous and regular shell compared to line-produced moulded products. Indeed, the difference in thickness between the lower and the upper part of the shell does not exceed 1 mm, preferably does not exceed 0.5 mm. The "bleeding" problem often found when using standard chocolate coating of extruded products is thus avoided.

The product of the invention will also have an attractive smooth, glossy surface, with no protrusions—despite the presence of inclusions in the shell (if any), as any inclusions in the shell will flush with the outer surface of the shell.

Finally, the texture contrast between the crispiness of the shell, the solid aspect of the inclusions therein and the creamy, fine texture of the frozen confection are all characteristics which mark an improvement in the moulded products thus far achieved.

The invention has found that it is possible to produce moulded ice cream stick bars of premium quality with a high definition of shape of the shell and a core of ice confection of a textural quality similar to an extruded stick bar by a simple method using conventional stick moulding equipment without involving a specific additional air/nitrogen cooling station.

The invention will now be described with an example which does not limit the scope of the present invention.

EXAMPLE

Equipment

Moulding line (e.g. inline machine)
Chocolate tank with specific mixer (chocolate temperature: 40 to 60° C.)
Pump for chocolate recirculation
Volumetric filler with double-jacket for chocolate
Two back-suction units with double jacket for chocolate suck-backing
Bottom-up ice cream filler (ice-cream temperature: −6° C.)
Stamping system for ice-cream (if needed)
Dosing system for dry ingredients (if needed)
Volumetric filler for top filling (temperature: 0° C.)

Example for a Manufacturing Process

A moulding line running at a cadence of 15 to 23 strokes/minute is refrigerated by passing through a brine bath (−38° C. to −40° C.). 50 to 130 ml of chocolate is dispensed in each mould by a volumetric filler with double-jacket associated to the chocolate tank via a recirculation pump. After the shell dosing, the inside of each mould is brought in contact with two back-suction units in turn. After this back-suction step, a chocolate shell of 17 to 23 mL is obtained. 40 mL to 80 mL of the frozen confection (core) kept at −6° C. and e.g. having an overrun of 100% is dispensed from the bottom-up filler into the moulds at a rate flow of 250 to 350 l/h. 1 to 3 g of dry ingredients (kept at ambient temperature) are then added to the moulds and the sticks are thereafter inserted. 2 to 7 mL of a liquid preparation (kept at 0° C.) is then added as a closure. The moulds are then passed through a water bath (12° C. to 15° C.) for demoulding thus providing the finished product.

The invention claimed is:

1. A method for making a frozen confectionery product, comprising the steps of:
    filling an interior space of a mold having a temperature less than 0° C., a closed end, and an open end with an interior surface disposed therebetween and surrounding the interior space of the mold with an excess of liquid chocolate in a refrigerated environment to provide a crispy frozen chocolate lining directly upon and in intimate contact with the interior surface of the mold, wherein the liquid chocolate has a yield value of 0.02 to 0.1 Pa at 50° C. and a plastic viscosity of greater than 0.15 Pas to 0.23 Pas at 50° C. and the crispy frozen chocolate lining has open end, a closed end, and a wall of crispy frozen chocolate extending therebetween and defining an interior space;
    removing non-solidified liquid chocolate from the interior space of the mold according to a suck back process; and
    filling the interior space of the crispy frozen chocolate lining through the open end with a frozen non-expanding confection under a pressure in a range from 1 to 3 bars and at a temperature of less than −6° C. to form the frozen confectionery product, wherein the frozen non-expanding confection within the interior space of the crispy frozen chocolate lining has a creamy, fine texture substantially devoid of ice crystals,
    wherein the crispy frozen chocolate lining has a snap when broken, a smooth glossy outer surface, and a variation in a uniformity of thickness of less than or about 1 mm as measured between any two points along the entirety of the crispy frozen chocolate lining.

2. The method of claim 1, further comprising the steps of inserting a stick in the frozen non-expanding confection of the frozen confection product; removing the frozen confection product from the mold; and packing the frozen confection product.

3. The method of claim 1, further comprising the step of homogeneously distributing inclusions in the liquid chocolate before the step of filling the interior space of the mold.

4. The method of claim 1, further comprising the step of homogeneously distributing inclusions in the frozen non-expanding confection before the step of filling the interior space of the crispy frozen chocolate lining.

5. The method of claim 1, further comprising the step of adding inclusions into the frozen non-expanding confection after the step of filling the interior space of the crispy frozen chocolate lining.

6. The method of claim 2, further comprising the step of applying a layer of a confectionery fat-based composition upon the frozen non-expanding confection after the steps of filling the interior space of the crispy frozen chocolate lining and removing the frozen confection product from the mold.

7. The method of claim 1, wherein the frozen non-expanding confection is selected from the group consisting of ice-cream, sorbet, and water-ice.

8. The method of claim 7, wherein the frozen non-expanding confection further comprises at least one sauce selected from the group consisting of chocolate sauce, fruit sauce, caramel sauce, and mixtures thereof.

9. The method of claim 1, wherein the interior space of the crispy frozen chocolate lining is filled to within 3 mm to 8 mm of the open end of the interior space of the crispy frozen chocolate lining.

10. The method of claim 1, wherein inclusions are provided in at least one of the crispy frozen chocolate lining and the frozen non-expanding confection.

11. The method of claim 10, wherein the inclusions do not exceed 8 mm in size and are selected from the group consisting of sugars, gels, marshmallows, fudge, pieces of preserved fruits, almonds, nuts, nougatine, coconut, cocoa nibs, toasted, puffed or roasted cereal flakes, biscuit crumbs, and combinations thereof.

12. The method of claim 10, wherein the inclusions have a size between 2 to 4 mm.

13. A frozen confectionery product obtainable by the method of claim 1.

14. The frozen confectionery product of claim 13, wherein the crispy frozen chocolate lining exhibits a difference in thickness less than 1 mm between a first part of the wall of the crispy frozen chocolate lining adjacent the open end and a second part of the wall of the crispy frozen chocolate lining adjacent the closed end.

15. The frozen confectionery product of claim 13, further comprising a top coating of a confectionery fat-based composition to close the open end of the crispy frozen chocolate lining.

16. The frozen confectionery product of claim 13, further comprising:
   a stick inserted into the frozen non-expanding confectionery and protruding from the open end of the crispy frozen chocolate lining; and
   inclusions accumulated on at least a portion of the frozen non-expanding confection adjacent the stick.

17. The frozen confectionery product of claim 13, further comprising:
   a stick inserted into the frozen non-expanding confectionery and protruding from the open end of the crispy frozen chocolate lining; and
   a layer selected from the group consisting of a confectionery fat, ice-cream, sorbet, or mixtures thereof coated on at least a portion of the frozen non-expanding confection adjacent the stick.

18. The method of claim 2, further comprising the step of providing inclusions on at least a portion of the frozen non-expanding confection adjacent the stick.

19. The frozen confectionery product of claim 13, further comprising inclusions homogeneously distributed within the wall of the crispy frozen chocolate lining, wherein the inclusions do not protrude from a uniformly smooth outer surface of the crispy frozen chocolate lining.

20. The frozen confectionery product of claim 14, wherein the difference in thickness of the wall of the crispy frozen chocolate lining does not exceed 0.5 mm.

21. The method according to claim 1, wherein the uniformity of thickness of the crispy frozen chocolate lining does not exceed 0.5 mm.

* * * * *

UNITED STATES PATENT AND TRADEMARK OFFICE
CERTIFICATE OF CORRECTION

PATENT NO. : 8,980,354 B2  
APPLICATION NO. : 12/160981  
DATED : March 17, 2015  
INVENTOR(S) : Ginette A. Harlaux-Pasquier et al.

Page 1 of 1

It is certified that error appears in the above-identified patent and that said Letters Patent is hereby corrected as shown below:

In the Claims:  
Column 6, line 50: After "chocolate lining has" insert -- an --

Signed and Sealed this  
Twenty-first Day of July, 2015

Michelle K. Lee  
*Director of the United States Patent and Trademark Office*